May 18, 1965 R. GILMONT 3,183,713

FLOWMETER

Filed March 28, 1962

INVENTOR.
ROGER GILMONT

BY *James and Franklin*

ATTORNEYS

= # United States Patent Office 3,183,713
Patented May 18, 1965

3,183,713
FLOWMETER
Roger Gilmont, Douglaston, N.Y., assignor to Roger Gilmont Instruments, Inc., Great Neck, N.Y., a corporation of New York
Filed Mar. 28, 1962, Ser. No. 183,238
3 Claims. (Cl. 73—209)

The present invention relates to the construction of a rotameter-type flowmeter, and relates particularly to means for facilitating the assembly of such devices and their connection into the systems where they are to be used.

Rotameter-type flowmeters are well known instruments for measuring the rate of flow of fluids. They generally comprise a tube having a tapered bore within which a float, usually in the form of a sphere, is received. As fluid flows through the bore it lifts the float from the small-diameter end of the bore, the clearance between the float and the bore thus increasing as the float rises. The float will assume a position in the bore such that the clearance between itself and the inner bore surface will permit such flow of fluid through that clearance as to suspend the ball in a condition of equilibrium. When appropriate corrections are made for the density and viscosity of the flowing fluid, the position of the float along the length of the bore can be translated into accurate values of rates of fluid flow.

One problem involved in the use of devices of this type is that of connecting, in a leak-proof manner, the flowmeter tubes into the systems through which the fluid under test is flowing. Another problem involves the manufacture of the tubes in a precision manner and the assembly thereof with the float in such a way as to ensure that the float will remain in the tube at all times, both when no flow is being measured and when the rate of fluid flow exceeds the value for which the tube is calibrated.

It is now possible to obtain precision bore tubing on a commercial, and hence relatively inexpensive, basis, that tubing usually being manufactured by being formed about an appropriately shaped mandrel of closely controlled dimensions. Such tubing cannot, as a practical matter, be used in a flowmeter without modification, because means should be provided for retaining the float within the bore and for attaching various types of connectors or joints to the meter in order that it can be removably inserted into those systems where measurement of fluid flow is desired. Moreover, the seals formed between the measuring tube and the system into which it is connected must be fluid-tight, not only because of accuracy requirements but also in order to prevent escape of the fluid being measured, which may be noxious or otherwise dangerous or unpleasant, or to prevent the entry of undesired air into the system.

In accordance with the present invention commercially available precision bore tubing can be employed for flowmeter use, the float may be readily assembled therewith and retained therewithin, and the connection of the flowmeter tube assembly into a given system can be accomplished in an exceedingly facile manner, and by means of any desired type of connector, without any sacrifice in the reliability and efficacy of the fluid-tight connection of the joint.

To accomplish these desirable results I provide plugs for each end of the precision bore tube, which plugs function as stops for the float, positively preventing it from escaping from the bore. The plugs also serve as joining members permitting the operative attachment to the flowmeter tube of such type of connector as may be desired. The plugs, which are preferably formed of some self-lubricating plastic material such as a member of the fluorocarbon family, have first portions sealingly received in an end of the flowmeter tube, those first plug portions having parts extending into the tube which the float is adapted to engage, those parts therefore functioning as positive stops for the float. Openings are provided between those parts through which fluid can flow from the exterior of the device into the precision bore of the tube. The plugs have second portions which extend out beyond the ends of the flowmeter tubes, over which second plug portions connectors are adapted to be telescoped in sealing engagement. Sealing means such as O-rings are compressed between the facing ends of the connectors and the flowmeter tube, thereby perfecting the fluid-tight nature of the seal produced.

To the accomplishment of the above, and to such other objects as may hereinafter appear, the present invention relates to the flowmeter construction as defined in the appended claims and as described in this specification, taken together with the accompanying drawings, in which:

Figure 1:
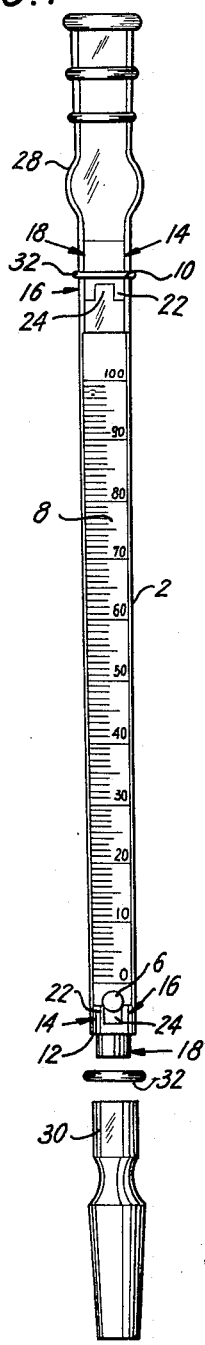
FIG. 1 is a front elevational view, partly exploded, of an assembly of a flowmeter and typical connectors.

Referring first to the embodiment disclosed in FIGS. 1, 2, 4 and 5, the flowmeter proper comprises a tube 2 formed of glass or the like and provided with an axially tapered bore 4 the diameter of which is larger at the upper end and smaller at the lower end. A float member 6, usually in the form of a glass ball, is received within and is slidable along the bore 4. The ball 6 has a diameter which is preferably slightly smaller than the minimum inner diameter of the bore 4. The outer surface of the tube 2 is provided with an appropriately graduated scale 8 through which the ball 6 is visible, the ball 6 preferably being formed of some contrasting color, such as black, to increase its visibility and thus facilitate the accurate determination of its position along the bore 4 in terms of the graduations on the scale 8. The tube 2 is provided with upper and lower end surfaces 10 and 12 respectively with which the bore 4 communicates. While the tube 2 as thus far described can, together with the float 6, function as a flowmeter, it will be seen that no means are provided for connecting it into the system where it is to be used, and that no means are provided for fixing the initial or at-rest position of the float 6 at the lower end of the bore 4, or for preventing the float 6 from being forced out from the upper end of the bore 4 if the fluid under test flows at an excessive rate.

To solve these problems I employ, at each end of the tube 2, a plug member generally designated 14. The plug members 14 at the top and bottom of the tube 2 are essentially the same, but will be somewhat differently dimensioned because of the differences in the internal diameter of the bore 4 at the ends of the tube 2. Each plug 14 is preferably formed of a self-lubricating plastic material which will be resistant to the corrosive or other deleterious effects of the test fluids with which the meter is to be used. Synthetic plastics of the fluorocarbon family, such as polytetrafluoroethylene ("Teflon") have proved to be exceptionally suitable in this regard. The plugs 14 comprise a first portion 16 shaped and sized to be a press fit into the end of the bore 4 where the plug 14 is to be used, the plug 14 having a second and enlarged portion 18 which extends out beyond the end of the tube 2 but has an outer dimension smaller than the corresponding outer dimension of the tube 2. A shoulder 20 is defined on the portion 18 which is adapted to rest against the end surface 10 or 12 of the tube 2 when the plug 14 is inserted thereinto. In order to facilitate the creation of an effective fluid-tight seal between the plug 14 and the tube 2, it is preferred that the inner and end surfaces of the tube 2 which are engaged by the plug 14 should be vacuum ground and polished to a high degree of smoothness.

The first portion 16 of the plug 14 comprises a pair of inwardly projecting parts 22 separated by gaps 24, those gaps defining openings communicating with a central axial passage 26. The diametrical spacing between the radially innermost surfaces of the parts 22 is less than the diameter of the float 6. Hence, when no fluid is flowing through the bore 4 and the float 6 therefore falls of its own weight (see FIG. 1), the ball 6 will engage and rest upon the upper edges of the parts 22. When fluid starts to flow that fluid will pass through the passage 26 and the gaps 24, and will then flow around the float 6 and into the bore 4, thus lifting the float 6 to a position along the bore 4 corresponding to the rate at which the fluid is flowing as well as corresponding to the density and viscosity of that fluid. If the fluid should flow rapidly enough to force the float 6 all the way to the top of the bore 4, that float will then engage the parts 22 on the uppermost plug 14 and thus will be positively retained within the bore 4, the fluid flowing through the gaps 24 and the passage 26 in that upper plug 14 in order to escape from the tube 2.

The second portions 18 of the plugs 14 are utilized to detachably connect the metering tube 2 to the external system. As shown in FIG. 1, standard glass taper connectors are connected to the plugs 14, a female connector 28 being connected to the upper plug 14 and a male connector 30 being connected to the lower plug 14, in each case by being telescoped over the second portions 18 of those plugs 14 respectively, preferably making a press fit therewith. In order to ensure the attainment of a fluid-tight seal, it is preferred that the inner and end surfaces of the connectors 28 and 30 be vacuum ground and polished to a high degree of smoothness.

In order to further ensure the attainment of a proper seal, sealing rings 32, here shown in the form of compressible rubber O-rings, are snugly received over the second portions 18 of each plug 14 and are compressed between the end surfaces 10 and 12 of the tube 2 and the connectors 28 and 30 respectively.

Figure 2:
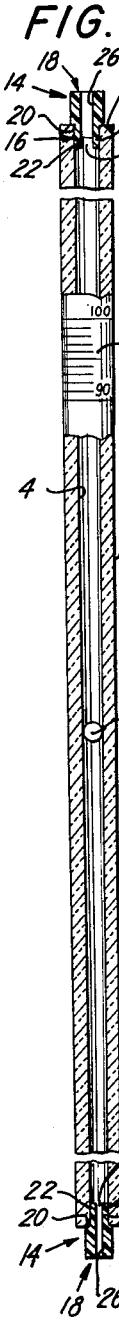
FIG. 2 is a fragmentary axial cross sectional view of one type of flowmeter tube with the float and end plugs in place, the float being shown in a typical position which it assumes while measuring fluid flow.
Figure 3:
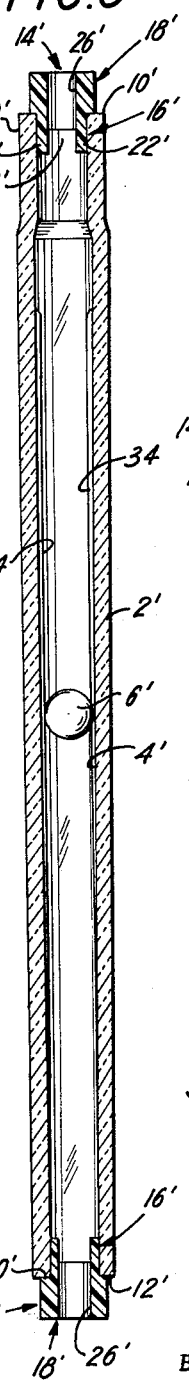
FIG. 3 is a view similar to FIG. 2 but showing a specifically different type of flowmeter tube.
Figure 4:
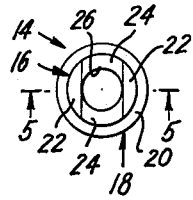
FIG. 4 is an end elevational view of a typical end plug.
Figure 5:
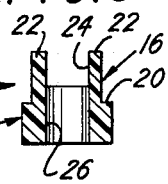
FIG. 5 is a cross sectional view taken along the line 5—5 of FIG. 4.

The tube 2 shown in FIG. 2 is of the smooth bore type, such as is commonly used for small units of the type under discussion. FIG. 3 discloses a tube 2' of a type which may be used in larger sizes, the bore 4' thereof being tapered, but being provided with circumferentially spaced lands 34 extending inwardly from the inner surface thereof, between which lands 34 the float 6' is adapted to slide. The radially inner surfaces of the lands 34 are parallel to the axis of the bore 4'. The purpose of the lands 34 is to prevent the float 6' from wobbling excessively from side to side, the tapered space through which the test fluid flows being defined circumferentially inside the lands 34 and radially between the float 6' and the inner surface of the bore 4'. The plugs 14' utilized in conjunction with the tube 2' are substantially the same as those shown in FIG. 2, except that they are dimensioned to correspond to the dimensions of the tube 2' with which they are used.

Figure 6:
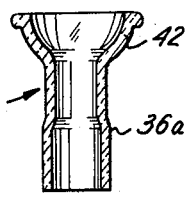
FIGS. 6 and 7 are axial cross sectional views of different types of connectors from those shown in FIG. 1.
Figure 7:
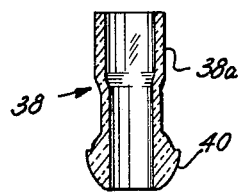

FIGS. 6 and 7 are cross sectional views of the female and male elements 36 and 38 respectively of conventional ball type connectors which may be used interchangeably with the connectors 28 and 30 of FIG. 1. The ball part 40 of the element 38 is adapted to be received inside the socket part 42 of an element 36. Each of the elements 36 and 38, like the connector elements 28 and 30, are provided with portions 36a and 38a respectively, which are adapted to be telescoped over the second portions 18 and 18' of the plugs 14 or 14' respectively, preferably making a press fit therewith.

Through the use of the plugs 14 in conjunction with the precision tapered bore tubes 2, the assembly of the devices, including the connectors 28, 30, 36 and/or 38, is greatly facilitated. Commercially available precision bore tubing 2 may be employed. To assemble the operative parts of the meter the plug 14 is inserted into the lower end of a given tube 2, the float 6 is dropped into the upper end thereof, a plug 14 is inserted into that upper end, and the meter proper is then ready for use with such connectors or joints as may be desired.

The limits of movement of the float 6 are positively fixed, escape of the float 6 from the bore 4 is positively prevented, attachment and detachment of appropriate connectors is greatly facilitated, while at the same time an effective fluid-tight seal is ensured between the joint parts. Thus the construction here disclosed, while it can be manufactured and assembled inexpensively and easily, results in an instrument which is accurate, reliable and useable in a wide variety of systems and applications.

While but a limited number of embodiments of the present invention have been here specifically disclosed, it will be apparent that many variations may be made therein, all within the spirit of the invention as defined in the following claims.

I claim:

1. A flowmeter comprising a rigid tube open at both ends and having a tapered bore communicating with said end openings, a float in said bore and slidable therealong, a plug having a first portion received in an end of said tube, a second portion extending out from said tube, and a passage therethrough communicating with said bore, said second portion being wider than said bore and having a surface engaging the end surface of said tube, said first plug portion sealingly engaging the interior of said bore and the inner end of said first plug portion having parts adapted to engage said float and act as stops therefor, said plug having openings between said parts, said openings communicating between said bore and said plug passage, a rigid connector having a passage therethrough, said connector being received over and sealingly engaging said second plug portion, the external dimension of said second plug portion being less than the external dimension of the corresponding tube end, and a sealing ring extending around said second plug portion and compressed between said tube end and said connector.

2. The flowmeter of claim 1, in which said tube is formed of glass, said plug is formed of self-lubricating plastic material, and the inner and facing end surfaces of said tube and connector have a high degree of smoothness.

3. The flowmeter of claim 1, in which said tube and said connector are formed of glass, said plug is formed of self-lubricating plastic material, and the inner and facing end surfaces of said tube and connector have a high degree of smoothness.

References Cited by the Examiner

UNITED STATES PATENTS

| 2,252,883 | 8/41 | Everson | 73—209 |
| 2,470,359 | 5/49 | McLean | 285—109 |
| 2,672,051 | 3/54 | Butler | 73—209 |
| 2,776,151 | 1/57 | Horkenrider | 285—174 X |

FOREIGN PATENTS

| 627,278 | 8/59 | Great Britain. |

RICHARD C. QUEISSER, *Primary Examiner.*

ROBERT L. EVANS, *Examiner.*